United States Patent [19]

Maier

[11] Patent Number: 4,918,455

[45] Date of Patent: Apr. 17, 1990

[54] ASSOCIATIVE HIERARCHIACL DEINTERLEAVER

[75] Inventor: Mark W. Maier, Los Angeles, Calif.

[73] Assignee: Hughes Aircraft Company, Los Angeles, Calif.

[21] Appl. No.: 266,739

[22] Filed: Nov. 3, 1988

[51] Int. Cl.$^4$ .............................................. G01S 7/44
[52] U.S. Cl. .................................................... 342/13
[58] Field of Search ......................... 342/13; 328/119; 364/517

[56] References Cited

U.S. PATENT DOCUMENTS

| 3,922,676 | 11/1975 | O'Berry et al. | 342/13 |
| 4,146,892 | 3/1979 | Overman et al. | 342/13 |
| 4,217,580 | 8/1980 | Lowenshuss | 342/13 |
| 4,393,382 | 7/1983 | Jones | 342/13 |
| 4,721,958 | 1/1988 | Jenkin | 342/13 |

Primary Examiner—Thomas H. Tarcza
Assistant Examiner—Mark Hellner
Attorney, Agent, or Firm—Leonard A. Alkov; Wanda Denson-Low

[57] ABSTRACT

Sequential signal pulses from unknown sources are deinterleaved by clustering similar pulses into groups. The groups are used to form hypothetical pulse train models. If the hypotheticals are confirmed, they are used to deinterleave corresponding signal pulses. Unconfirmed hypotheticals are deleted.

41 Claims, 2 Drawing Sheets

ASSOCIATIVE HIERARCHIACL DEINTERLEAVER

FIELD OF THE INVENTION

This invention pertains to the field of deinterleaving a sequence of received signal pulses, and more particularly to identifying radar emitters in an electronic warfare system.

BACKGROUND OF THE INVENTION

A primary function of electronic warfare (EW) systems is to identify radar signal sources. If the EW system is carried aboard a fighter aircraft, for example, the system will listen for radar signals striking the aircraft. It will then attempt to determine the location and movement of the various sources of the radar signals and perhaps identify the source as well. For every object which emits receivable radio waves, the optimal EW system would give the aircraft pilot a complete description of the object.

With the optimal EW system, the pilot would be warned of missiles, aircraft, ground and airborne surveillance systems and a host of other objects, complete with a report of the missile or aircraft type, its location, its trajectory, and more. Unfortunately, the signals received by the aircraft are not sorted according to source, but superimposed over each other or interleaved. A basic requirement of any EW system is that it be capable of deinterleaving the radar signals. In other words, it must be able to group the signals according to their source.

Present EW systems attempt to do this by matching groups of incoming signals to models of various known radar sources, for example, friendly aircraft or dangerous missiles. The groups of signals which do not match any of the models are either discarded or stored for analysis on the ground in much larger computing systems. This approach has several disadvantages. First, any group of signals which does not match a known model cannot be identified unless and until the aircraft lands. By that time it is too late for the pilot to take evasive action. Second, there is an inherent time delay because a group of signals must be collected before they may be analyzed. If a radar signal source emits only a small number of pulses very quickly, it may not be identified until it disappears.

With the advent of digital radar, the problems with existing deinterleavers become even more acute. While analog radars could generate only a small range of different signals, a digital radar can greatly vary amplitude, frequency, modulation, and many other parameters of its signals with great speed. As a result, a great many more models are required to effectively deinterleave even signals from known sources. With analog radar, one or two models might suffice to identify a specific type of airplane or missile. Once this signal was received and analyzed, it remained a characteristic for that type of source until substantial changes were made to the source's radar hardware. With digital radar, a much larger range of radar signals must be analyzed in order to identify the radar source. It is highly unlikely that the source will display its whole range of capabilities after only a few encounters.

SUMMARY OF THE INVENTION

The present invention overcomes these difficulties because it processes incoming radar signals as they are received and because it does not need to rely on preprogrammed models. While pre-programmed models may be used to help identify some stable sources of radar signals, the present invention generates its own models based on the signals actually received.

The present invention is a method and apparatus for deinterleaving signal pulses. The method includes the steps of (1) grouping signal pulses which have at least one similar parameter, (2) based on the parameter values of the group, predicting a value for a different parameter for other signal pulses which have yet to be associated with the group, (3) associating signal pulses with the group which have both the at least one similar parameter and the predicted parameter in common with the group (4) reporting an indication of the parameters of the group after a threshold number of pulses are associated with the group. The apparatus is comprised of means for accomplishing these steps.

BRIEF DESCRIPTION OF THE DRAWINGS

FIG. I is a block diagram of an EW system.

DETAILED DESCRIPTION OF THE INVENTION

Figure 1:
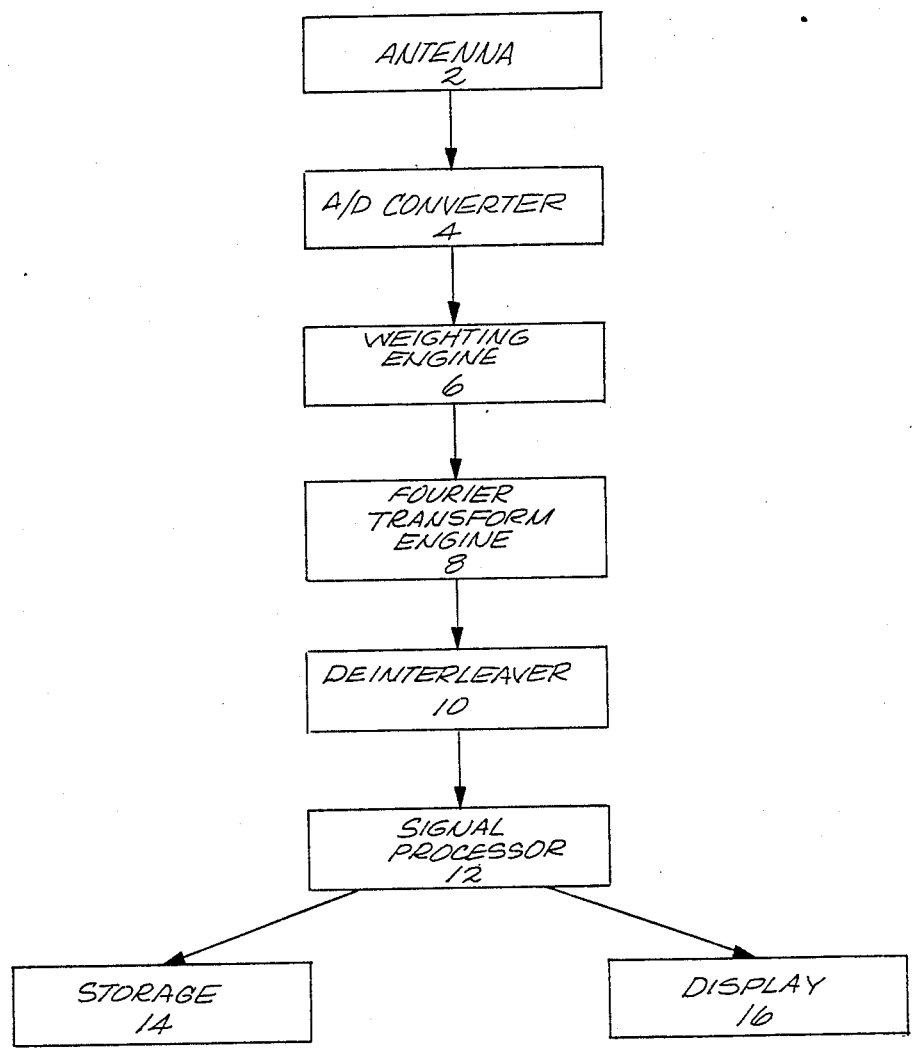

The present invention is an integral part of a radar signal receiving and processing system commonly used in electronic warfare (EW systems). As shown in FIG. 1, the digital EW system typically includes an antenna 2 for receiving radar signals from unknown and known sources in the surrounding environment, an analog to digital converter 4 for converting the analog signal pulses to digital pulse descriptor words, a weighting engine 6 for boosting the signal pulses above the level of background noise, a Fourier transform engine 8 for converting the signals from the time domain to the frequency domain, a deinterleaver 10 for associating related signals and identifying their source, a signal processor 12 for any further processing which may be necessary, a storage device 14 for storing signal information, and a display 16 for reporting the information to an EW system operator, for example, an aircraft pilot. The system may include additional components not shown and not essential to the description here. The present invention may also be used in other types of systems. For example, the converter 4, weighting engine 6 and Fourier transform engine 8 could be placed with an analog, channelizer and detector and the present invention may be used in other signal processing environments. The present invention replaces the deinterleaver presently used in these types of systems.

In an exemplary embodiment, the input to the deinterleaver is a series of pulse descriptor words. As can be seen from FIG. 1, the incoming radar signal pulses are processed in real time through to the deinterleaver. The pulse descriptor words therefore arrive in a steady stream. The information in each word will vary depending on the capabilities of the system used. However, for purposes of the present example, the word will be assumed to describe a single pulse. The components of the word will be assumed to be the frequency of the pulse, the angle of arrival of the pulse, and the time of arrival of the pulse. While the pulse descriptor words arrive at the deinterleaver in the same order in which they arrived at the antenna, it is convenient to have the time of arrival be a part of the pulse descriptor words.

Figure 2:
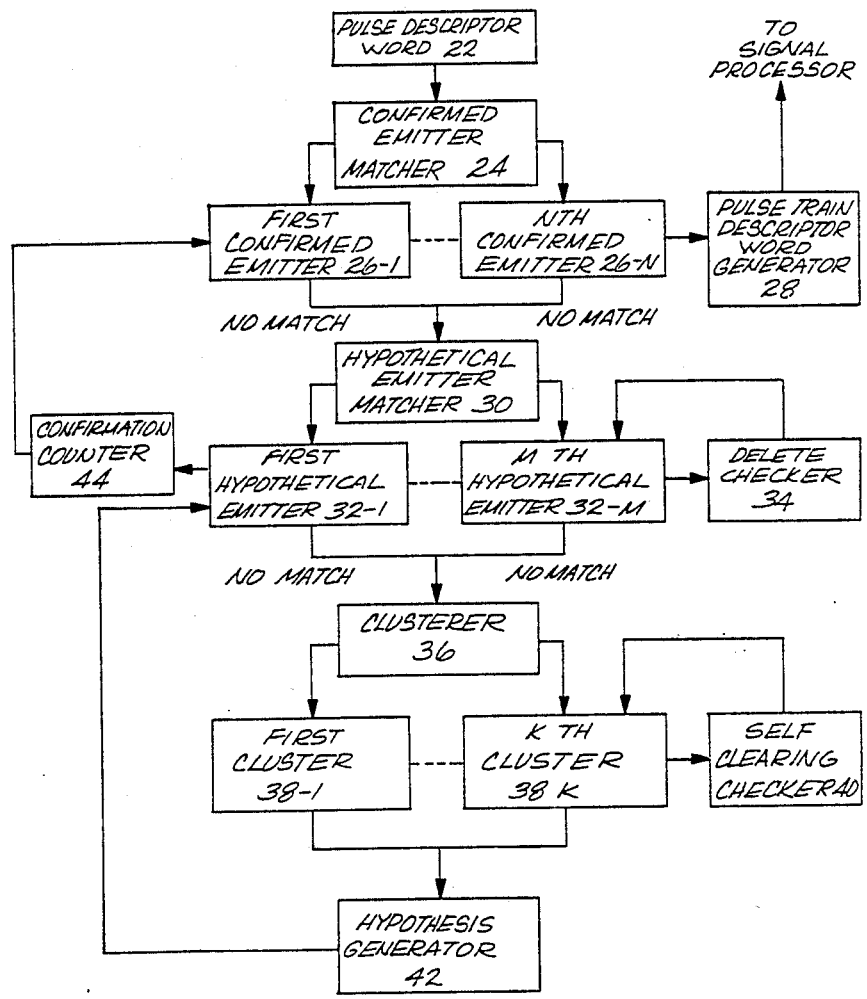
FIG. 2 is a flow diagram showing the major features of the present invention.

A major purpose of the deinterleaver is to reassociate randomly ordered signal pulses into their proper groups according to their source. To this end, the pulse descriptor words go through three hierarchical levels of matching tests. FIG. 2 shows a flow chart of the basic operation of the invention. In FIG. 2, each pulse descriptor word 22 is first compared to confirmed emitters 24. If there is no match with any of the first through Nth confirmed emitters 26-1 to 26-N, it is compared to hypothetical emitters 30. If there is no match with any of the first through Mth hypothetical emitters, 32-1 to 32-M, then the word is placed in one of the first through Kth clusters, 38-1 to 38-K at the clustering step 36. The emitters are groups of pulses built up from the clusters, so this description shall begin at the level of the cluster. While the cluster level is the end level for the pulse descriptor words, it is the beginning level for the emitters.

For purposes of this discussion, it will be assumed that, initially, the deinterleaver contains no emitters. All signals are therefore accumulated in clusters. In the present example, the pulse descriptor words describe frequency, angle of arrival and time of arrival. Each cluster is a group of words that have similar values for frequency and angle of arrival. Similarity is determined using a tolerance as described below. The clustering step is essentially a matching function.

The first pulse descriptor word received cannot be matched as there is nothing to match it with, so it is placed in a storage register. This creates the first cluster 38-1. The second descriptor word is compared to the first descriptor word. If the frequency and angle for the second word are similar to the first word, then the second word is also placed in the first cluster 38-1. The two words are thus clustered together in a single group. If the parameters of the second word are clearly different, then it is placed in a second cluster 38-2.

The clusterer 36 uses four truth tests to determine whether there is a match for each cluster.

Test 1 ($T_1$): $F_w > F_c - dF$
Test 2 ($T_2$): $F_w < F_c + dF$
Test 3 ($T_3$): $A_w > A_c - dA$
Test 4 ($T_4$): $A_w < A_c + dA$ The first test asks whether the frequency of the new word ($F_w$) is greater than the frequency of the cluster ($F_c$) less a tolerance level (dF). The tolerance level accounts for measurement errors and variations in the output of the radar signal source. The second test asks whether the frequency of the new word ($F_w$) is less than the frequency of the cluster ($F_c$) plus the tolerance (dF). Tests 1 and 2 are therefore satisfied if the frequency of the new word is equal to the frequency of the cluster plus or minus the tolerance. Tests 3 and 4 ask the same question for angle of arrival. $A_w$ is the angle of arrival of the new word. $A_c$ is the angle of arrival for the cluster and dA is the tolerance for the angle of arrival. If all four tests are satisfied for a cluster, then the new word is declared to be similar and is placed in that cluster. If not, the new word is compared to the other clusters. Symbolically, a match is declared if:

$T_1.AND.T_2.AND.T_3.AND.T_4 = TRUE.$

So far in the discussion, only two words have been received, therefore, only one matching test has been performed. If there is no match, then the second word begins its own cluster. The third word will be compared to both the first and second cluster if a second cluster exists.

The invention continues to associate words into clusters as they are received. When a cluster acquires a given number of words, for example, two, then a hypothetical emitter 32 is generated by the hypothesis generator 42. The word "emitter" is used here to mean a model of the radar emission of a signal source. The emitter corresponds to the models mentioned in the Background section, but these emitters are generated by the deinterleaver and not pre-programmed as the prior art models are. Each emitter begins as a hypothetical emitter as will be explained below. The emitters are then either confirmed or rejected depending on the signals received by the deinterleaver.

To generate a hypothetical emitter, the hypothesis generator 42 analyzes the words in a particular cluster. When the cluster contains only two words, the exemplary embodiment will consider the difference between the times of arrival of the words and, based on that, predict the time of arrival of the next two words that will match the cluster. For example, if the times of arrival of the two words differ by 10 microseconds, then the hypothesis generator assumes a pulse repetition interval (PRI) of 10 microseconds. 10 microseconds are added to the time of arrival of the second pulse to obtain a first predicted time of arrival, and 10 microseconds are added to the first predicted time of arrival to obtain a second predicted time of arrival. Two predictions are made as a security measure in case the first predicted pulse is not detected for some reason.

The hypothetical emitter therefore is an outline for a group of words with a similar frequency, angle of arrival, and PRI. The outline includes predicted values and tolerances for each parameter. The hypothetical emitter is placed at the second matching level in the three-level hierarchy of FIG. 2 and becomes the first hypothetical emitter 32-1. The emitter is then matched to incoming descriptor words by the hypothetical emitter matcher 30.

The hypothetical emitter matcher 30 uses a series of truth tests just as the clusterer does. The tests for each hypothetical emitter are as follows:

Test 1 ($T_1$): $F_w > F_h - dF$
Test 2 ($T_2$): $F_w < F_h + dF$
Test 3 ($T_3$): $A_w > A_h - dA$
Test 4 ($T_4$): $A_w < A_h + dA$
Test 5 ($T_5$): $T_w > PT_1 - dT_1$
Test 6 ($T_6$): $T_w < PT_1 + dT_1$
Test 7 ($T_7$): $T_w > PT_2 - dT_2$
Test 8 ($T_8$): $T_w < PT_2 + dT_2$ $F_w$, $A_w$ and $T_w$ are the frequency, angle of arrival and time of arrival, respectively, of the incoming pulse descriptor word. $F_h$ and $A_h$ are the frequency and angle of arrival, respectively, for the hypothetical emitter. $PT_1$ and $PT_2$ are the first and second predicted times of arrival for the incoming pulse descriptor words, respectively. dF, dA, $dT_1$ and $dT_2$ are the tolerance levels for the frequency, angle of arrival, first time of arrival and second time of arrival, respectively.

An incoming descriptor word will be associated with the hypothetical emitter if tests 1, 2, 3 and 4 are satisfied, and either tests 5 and 6 or tests 7 and 8 are satisfied. Put another way, a match is declared with the hypothetical if:

$T_1.AND.T_2.AND.T_3.AND.T_4.AND.[(T_5.AND.T_6).OR.(T_7.AND.T_8)] = .TRUE.$

When an incoming descriptor word does not match any of the hypothetical emitters, it is passed on to the clusterer 36 at the third level in the matching hierarchy.

When a new word is associated with the hypothetical emitter, the hypothetical must be updated. The frequency and angle of arrival remain the same, but the predicted estimated times of arrival must be adjusted, so that the para-hypothetical emitter can be matched to new incoming words. The new first predicted time of arrival in this example is obtained by adding the PRI, 10 microseconds, for the first hypothetical emitter to the time of arrival of the new word. The second predicted time of arrival is obtained by adding the PRI to the first predicted time of arrival.

Hypothetical emitter may also be refined by techniques well known in the literature.

Each emitter 32-1 to 32-M also has a confirmation counter 44 which counts the number of words associated with the hypothetical emitter. When the counter reaches a threshold number of words, for example, seven or eight, then the hypothetical emitter becomes a confirmed emitter. When confirmed, the counter elevates the emitter to the first level of matching. The first hypothetical emitter to be confirmed becomes the first confirmed emitter 26-1. New incoming pulse descriptor words are matched with confirmed emitters at step 24 before they are matched with hypothetical emitters.

Each confirmed emitter, 26-1 to 26-N, is reported. In the present example, the reporting process starts at the pulse train descriptor word generator 28, which generates a pulse train descriptor word. The word describes the frequency, angle of arrival and PRI of the group of signal pulses that make up a confirmed emitter. The pulse train descriptor word also indicates when the emitter was confirmed and how long it has been received. The pulse train descriptor word is reported to the signal processor 12. From there it may be stored in the storage medium 14 and reported to the EW system operator on the display 16. From the display, the operator learns the angle of arrival, frequency and PRI for the emitter. Using this information, the operator can identify the nature of the source of the radar signal pulses. If the characteristics of the emitter correspond to a known source of radar, then the source can be identified either by the operator or by an automated device. If not, the information can be stored in the storage medium 14 shown in FIG. 1 for later analysis and identification.

Even if the signal source cannot be identified, the characteristics of the source and the amount of time that it is focusing radar signal pulses on the operator's aircraft are of great interest to the operator. Using prior art systems, the operator would not have this information. When the signals did not match a model with some prior art systems, the operator may be warned that unidentified radar signals are being received, but he would know nothing about their characteristics because signals, which do not match a predetermined known model, remain interleaved. Using the present invention, an operator with a good knowledge of radar systems can recognize whether radar sources are threatening or nonthreatening even if he has never seen the particular signal train before.

Returning now to the third matching level 36 where the clusters are formed, the first hypothetical emitter was generated when the first cluster acquired two words. It is likely that the cluster will soon acquire a third word. The third word allows two more hypothetical emitters to be generated. Hypothetical emitters are generated by predicting times of arrival for succeeding pulses based on the times of arrival of the pulses in the cluster. The first hypothetical emitter assumed a PRI equal to the difference between the time of arrival for the first word and the second word. The PRI was added to the second word's time of arrival to obtain a first predicted time of arrival. The second predicted time of arrival was obtained by adding the PRI to the first predicted time of arrival.

Using the third word, two new hypothetical emitters based on the PRIs are generated, the first by comparing the time of arrival of the third and first words and the second by comparing the time of arrival of the third and second words. From these two PRIs, two hypothetical emitters are generated and added to the second matching level 30.

When a fourth word is added to the cluster, three more PRIs are calculated. The first is generated by comparing the fourth and third words, the second by comparing the fourth and second words, and the third by comparing the fourth and first words. This results in three more hypothetical emitters and so on. New hypotheticals are generated in each cluster each time a new word is associated with that cluster. Obviously, the number of hypothetical emitters could grow very quickly. Suppose an airplane were equipped with the present invention, and there were no confirmed or hypothetical emitters in the system. If the airplane was exposed to one radar signal source with constant frequency and angle of arrival, and a PRI of 10 microseconds which is not uncommon, then, after 1 millisecond, assuming that all the pulses fall to the clustering level, the system would have generated 5,000 hypothetical emitters. This volume of emitters would reach huge amounts of memory and processing ability. As a result, several features of the system are designed to limit the number of hypothetical emitters which are generated.

If, in fact, there was only one signal source, then no deinterleaving would be required. The present invention is intended for use in environments with substantially more signal sources, which would mean substantially more hypothetical emitters. Therefore, in order to limit the amount of hardware needed to implement the invention, there are limits on the generation and retention of hypothetical emitters.

First, the matching is hierarchical. Words that are matched with a confirmed emitter are retained at that level and not matched to hypothetical emitters. Words that are matched to hypothetical emitters are retained at that level and not associated with clusters. As a result, a great number of words are prevented from reaching the level of the clusters and cannot contribute to generating hypothetical emitters.

Second, hypothetical emitters are not generated using every single pulse that matches a cluster's parameters. Only a limited number of words are retained in each cluster. When the cluster's capacity is reached, the earliest received word in the cluster is discarded to make room for the latest word. The precise number of words in each cluster will depend on the hardware used to implement the invention. If, for example, each cluster has a ten word capacity, then after the cluster is filled, only nine new hypothetical emitters would be generated for each new word associated with the cluster.

Third, every hypothetical emitter includes a delete checker 34. Each hypothetical emitter processes every new word which is not matched with a confirmed emitter. If the time of arrival for a new word is later than the second predicted time of arrival, for a hypothetical emitter, then the hypothetical has failed and it is deleted. Symbolically, a self-deletion occurs if:

$$T_w > PT_2 + dT_2 = .TRUE.$$

A new hypothetical emitter may then fill the space formerly occupied by the old.

In this exemplary embodiment, the deinterleaver is implemented in rows of parallel processing cells. Confirmed emitter matching is done in parallel in the first row. If matches are declared, the incoming pulse descriptor words are retained at the confirmed emitter level. If no match occurs, the pulse descriptor words are transmitted to the second row, which is the hypothetical emitter level. All hypothetical emitter matching is done in parallel as well. The substantial majority of incoming pulse descriptor words will be matched with confirmed emitters. In the exemplary embodiment, an emitter can be confirmed after only ten pulses are received from a radar signal source. Two pulses are required to generate the hypothetical emitter and eight more are required to confirm the emitter. Since most radars send substantially more than ten pulses at a particular target, most pulses will be associated with confirmed emitters.

If the incoming pulse descriptor words do not match a confirmed emitter but do match a hypothetical emitter, then they are retained at the hypothetical emitter level. This level will absorb the substantial majority of the remaining incoming pulse descriptor words. The small number remaining will correspond to pulses from either brand new or highly erratic sources. These are sent to the third row of parallel processors for association with clusters.

It is very likely that clusters will quickly become inactive. A cluster is begun when a pulse with a unique frequency and angle of arrival are received. This pulse ordinarily corresponds to a radar signal source in the environment which has begun emitting a steady stream of identical radar signals. When the second pulse is received, a hypothetical emitter is generated and placed in a processor at the second row. The hypothetical emitter will retain the third through the tenth pulses from that same source. When the hypothetical is confirmed, it is placed in a processor at the first row where it will retain all pulses received after the tenth, until the signal source stops sending pulses to the antenna, or until it changes the characteristics of its pulses. As a result, the processor at the cluster level acquires no new pulses after the second pulse. Since the number of processors available for collecting clusters is limited, each processor has a self-clearing checker 40. If no new words are added to a cluster within a certain amount of time, the self-clearing checker discards the cluster, clearing the processor for a new cluster. A computer program listing which simulates the exemplary embodiment of the invention described above is attached to this application as Appendix A.

The invention as described above achieves nearly total deinterleaving using a minimum of hardware. The deinterleaving is much more complete and more flexible than with previous designs, because the device does not rely on any pre-programmed models. Any received signals can be grouped on the basis of their pattern of parameters, regardless of whether or not the pattern has been observed before.

The exemplary embodiment uses frequency, angle of arrival and time of arrival as its three parameters for deinterleaving, and it processes incoming pulses in real time. This mode of operation is considered the most useful for present airborne EW systems. However, the present invention is not limited to these parameters, to real-time parallel processing, nor to airborne systems. As radar systems change, different or additional parameters may be more desirable. Clusters may rely on matching three or four, or more, parameters. Or different clusters may be formed to match different sets of parameters. For example, one group of clusters may be used to match frequency and angle of arrival, and another group of clusters may be used to match modulation frequency and amplitude. Still another group of clusters may be used to match three or four, or more, of the measured parameters. All types of clusters may be combined in a single system.

Real-time parallel processing was chosen for speed. However, the invention may also be implemented with serial processing. In addition, the invention is not limited to EW systems. The present invention is useful wherever signals with unknown parameters must be sorted out and grouped together. These signals need not be radar signals but may be any other type of signal. Also, it is not necessary that the EW system be a digital system. The invention applies equally well to analog deinterleaving systems which produce digital pulses. In an analog system, the processing would not be applied to pulse descriptor words, but, for example, analog models of the pulses using rows of filters. In the prior art, the deinterleaver was preprogrammed with models of known emitters. Pulses which matched the emitters were separated out and reported. Preprogrammed confirmed emitters can be used for matching in the confirmed emitter matcher 24. In the parallel processor architecture described above, certain cells can be dedicated to preprogrammed models. These cells would not have a selfdelete checker, but would continuously separate out signals which match the models. Using preprogrammed models in addition to the confirmed emitters frees the deinterleaver from generating emitters for known, stable, radar signal sources, for example control towers, commercial communications transmitters and friendly aircraft.

It will be understood by one skilled in the art that many other modifications and adaptations to the present invention are possible without departing from the spirit and scope of the invention. The applicant, by describing only one embodiment, does not intend to abandon other modifications and adaptations within the spirit and scope of the invention.

What is claimed is:

1. A method for deinterleaving a plurality of signal pulses where each signal pulse is characterized by at least two parameters, the method comprising the steps of:

associating signal pulses having a similar value for one of the parameters into a group of signal pulses;
   predicting a value for another parameter for an additional signal pulse not associated with the group;
   associating signal pulses with the group which have values for the other parameter which are similar to the predicted parameter value; and
   reporting an indication of at least one of the parameter values of the signal pulses associated with the group if the group has more than a threshold number of signal pulses associated with it.

2. The method of claim 1 wherein the parameters characterizing each signal pulse comprise time of arrival and frequency.

3. The method of claim 1 wherein the parameters characterizing each signal pulse comprise time of arrival and angle of arrival.

4. A method for deinterleaving a sequence of signal pulses, each signal pulse being characterized by a time of arrival and at least two other parameters, the method comprising the steps of:
    associating signal pulses having a similar value for at least one of the at least two other parameters, into a group;
    if more than a first threshold number of signal pulses are associated with the group, predicting at least one value for the time of arrival of subsequent signal pulses;
    associating only subsequent signal pulses having both a similar value for the at least one of the at least two other parameters and a time of arrival similar to the at least one predicted time of arrival with the group; and
    if more than a second threshold number of signal pulses is associated with the group, reporting an indication of at least one of the parameters of the signal pulses associated with the group.

5. The method of claim 4 comprising two additional steps to be performed after the step of associating only subsequent signal pulses, the additional steps comprising:
    predicting a value for at least one additional time of arrival for subsequent pulses to be associated with the group only if a subsequent signal pulse is associated with the group; and
    associating only subsequent signal pulses having both a similar value for the at least one of the at least two other parameters and a time of arrival similar to the at least one additional predicted time of arrival for the group with the cluster.

6. The method of claim 5 comprising the additional step of repeating the step of predicting at least one additional time of arrival, and the step of associating subsequent signal pulses having a similar value to the at least one additional predicted time of arrival, until more than a second threshold number of signal pulses are associated with the group for which the steps are repeated.

7. The method of claim 6 wherein the step of repeating comprises the step of ceasing to predict the time of arrival for subsequent signal pulses if more than a third threshold number of predictions have been made and no signal pulse corresponding to a prediction has been associated with the group corresponding to the predicted times of arrival.

8. The method of claim 4 wherein one of the at least two other parameters is the frequency of the pulse.

9. The method of claim 4 wherein one of the at least two other parameters is the angle of arrival of the pulse.

10. The method of claim 4 wherein the step of associating signal pulses comprises the step of associating signal pulses having a similar value for two of the at least two other parameters.

11. The method of claim 4 wherein the step of associating signal pulses comprises the step of associating signal pulses having a similar value for two of the at least two other parameters, and wherein the step of associating only subsequent signal pulses comprises the step of associating only subsequent signal pulses having both a similar value for two of the at least two other parameters and a time of arrival similar to the at least one predicted time of arrival.

12. A method for deinterleaving a sequence of radar pulse descriptor words, each word including a value for a time of arrival and at least two other parameters of a pulse, the method comprising the steps of:
    associating words having similar values for at least one of the at least two other parameters in a group;
    if more than a first threshold number of words are associated in a group, predicting at least one time of arrival value for subsequent words to be associated with the group;
    associating only subsequent words having both a similar value for the at least one of the at least two other parameters and a time of arrival similar to the at least one predicted time of arrival with the group; and
    if more than a second threshold number of words is associated with the group, reporting an indication of at least one of the parameter values of the words associated with the group.

13. The method of claim 12 comprising the additional step of deleting a group if no subsequent words are associated with the group following the prediction of at least one predicted time of arrival.

14. The method of claim 12 wherein the at least two other parameters comprise angle of arrival and frequency.

15. The method of claim 12 wherein the step of reporting comprises generating a pulse train descriptor word.

16. The method of claim 12 comprising two additional steps after the step of associating only subsequent words, the additional steps comprising:
    predicting at least one additional time of arrival value for subsequent words to be associated with the group if a subsequent word is already associated with the group; and
    associating only subsequent words having both a similar value for the at least one of the at least two other parameters and a time of arrival similar to the at least one additional predicted time of arrival with the group.

17. The method of claim 12 also comprising the additional step of repeating the step of predicting at least one additional time of arrival and the step of associating subsequent words having a similar value for the at least one additional time of arrival 18. The method of claim 12 also comprising the additional step of deleting a cluster if less than a threshold number of words are associated with the cluster.

19. An apparatus for deinterleaving a plurality of signal pulses, each signal pulse having at least two parameters comprising:
    means for associating pulses for which a first parameter value is substantially similar into a group;
    means for predicting a value for a second parameter for an additional signal pulse not associated with the group;
    means for associating signal pulses having (parameter values substantially similar to the predicted parameter value with the group; and
    means for reporting an indication of at least one of the parameter values of the signal pulses associated with the group if the group has more than a threshold number of signal pulses associated with it.

20. The apparatus of claim 19 wherein the parameters characterizing each signal pulse comprise time of arrival.

21. The apparatus of claim 19 wherein the parameters characterizing each signal pulse comprise frequency.

22. An apparatus for deinterleaving a sequence of radar pulse descriptor words, each word including a value for a time of arrival and at least two other parameters of a pulse, comprising:
  means for associating words having similar values for at least one of the at least two other parameters in a group;
  means for predicting at least one time of arrival value for subsequent words to be associated with the group, if more than a first threshold number of words are associated with the group;
  means for associating only subsequent words having both a similar value for the at least one of the at least two other parameters and a time of arrival similar to the at least one predicted time of arrival with the group; and
  means for reporting an indication of at least one of the parameter values of the words associated with the group if more than a second threshold number of words is associated with the cluster.

23. The apparatus of claim 22 also comprising means for deleting a group if no subsequent words are associated with the group following the prediction of the at least one predicted time of arrival.

24. The apparatus of claim 22 also comprising means for deleting a group of less than a threshold number of words are associated with the group.

25. The apparatus of claim 22 wherein the at least two other parameters comprise angle of arrival and frequency.

26. The apparatus of claim 22 wherein the reporting means comprises means for generating a pulse train descriptor word.

27. A method for deinterleaving a plurality of signal pulses, wherein each signal pulse has at least two parameters, and at least some of the signal pulses are associated into groups, the signal pulses in a group having similar values for at least one parameter, the method comprising:
  predicting a value for another of the at least two parameters for signal pulses to be associated with a group;
  associating signal pulses having a value for the other parameter similar to the predicted value for the other parameter with the group; and
  reporting an indication of at least one of the parameter values of the signal pulses associated with the group if the group has more than a threshold number of signal pulses associated with it.

28. The method of claim 27 wherein the parameters comprise time of arrival and frequency.

29. The method of claim 27 wherein the parameters comprise time of arrival and angle of arrival.

30. A method for deinterleaving a sequence of signal pulses, wherein each signal pulse is characterized by a time of arrival and at least two other parameters, and at least some of the signal pulses are associated into groups, the signal pulses in a group having similar values for at least one parameter, the method comprising:
  predicting a time of arrival for subsequent signal pulses;
  associating signal pulses having both a time of arrival similar to the predicted time of arrival and a similar value for at least one of the two other parameters with the group; and
  reporting an indication of at least one of the parameter values of the signal pulses associated with the group.

31. The method of claim 30 comprising two additional steps to be performed after the step of associating, the additional steps comprising:
  predicting at least one additional time of arrival for subsequent signal pulses to be associated with the group; and
  associating subsequent signal pulses having both a time of arrival similar to the predicted additional time of arrival and a similar value for at least one of the two other parameters with the group.

32. The method of claim 31 comprising the additional steps of repeating the step of predicting at least one additional time of arrival, and the step of associating subsequent signal pulses having a time of arrival similar to the predicted additional time of arrival until at least a threshold number of signal pulses are associated with the group.

33. The method of claim 32 wherein the step of repeating comprises the step of ceasing to predict additional times of arrival for subsequent signal pulses if at least a second threshold number of predictions have been made and no signal pulse corresponding to a prediction has been associated with the group.

34. The method of claim 30 wherein one of the at least two other parameters is the frequency of the pulse.

35. The method of claim 30 wherein one of the at least two other parameters is the angle of arrival of the pulse.

36. An apparatus for deinterleaving a sequence of signal pulses, wherein each signal pulse is characterized by a time of arrival and at least two other parameters, and at least some of the signal pulses are associated into groups, the signal pulses in a group having similar values for at least one parameter, the apparatus comprising:
  means for predicting a time of arrival for subsequent signal pulses;
  means for associating signal pulses having both a time of arrival similar to the predicted time of arrival and a similar value for at least one of the two other parameters with the group; and
  means for reporting an indication of at least one of the parameter values of the signal pulses associated with the group.

37. The apparatus of claim 36 also comprising means for predicting at least one additional time of arrival for subsequent signal pulses to be associated with the group and means for associating subsequent signal pulses having both a time of arrival similar to the predicted additional time of arrival and a similar value for at least one of the two other parameters with the group.

38. The apparatus of claim 37 also comprising means for repeatedly predicting at least one additional time of arrival, and means for repeatedly associating subsequent signal pulses having a time of arrival similar to the predicted additional time of arrival until at least a threshold number of signal pulses are associated with the group.

39. The apparatus of claim 38 also comprising means for ceasing to predict additional times of arrival for subsequent signal pulses if at least a second threshold number of predictions have been made and no signal pulse corresponding to a prediction has been associated with the group.

40. The apparatus of claim 36 wherein one of the at least two other parameters is the frequency of the pulse.

41. The apparatus of claim 36 wherein one of the at least two other parameters is the angle of arrival of the pulse.

* * * * *